H. S. THOMAS.
BROOM CORN HARVESTER AND SEEDER.
APPLICATION FILED JUNE 27, 1912.
1,077,863.
Patented Nov. 4, 1913.
3 SHEETS—SHEET 2.
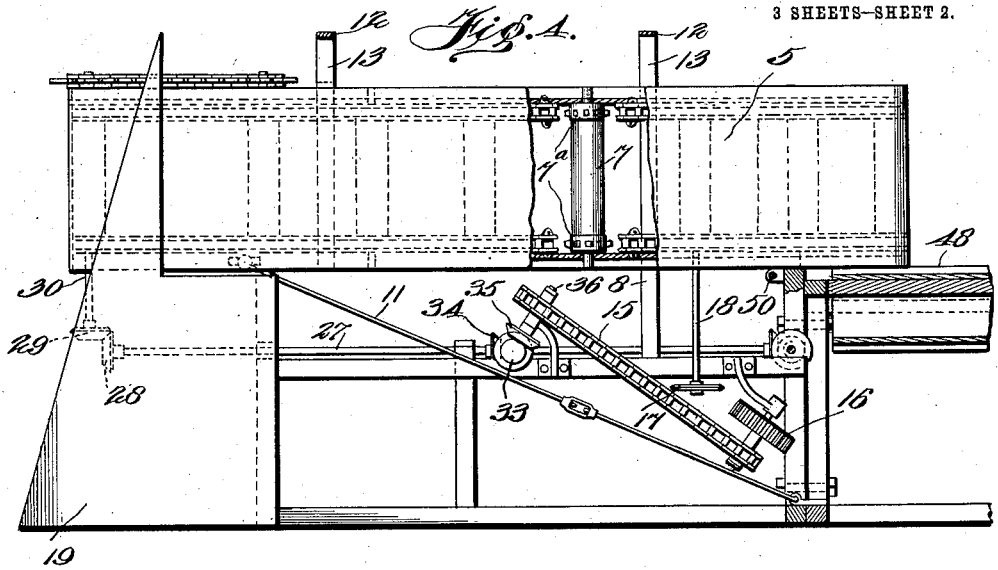
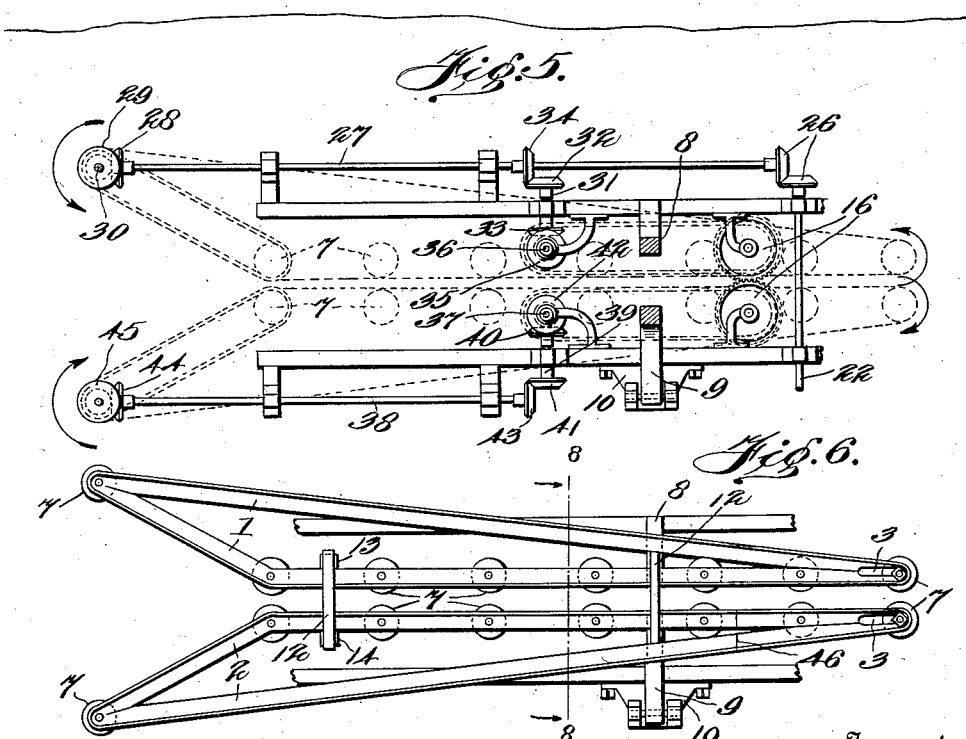
Witnesses
W. May Duvall.
Byron B. Collings.
Inventor
Henry S. Thomas,
by Wilkinson, Fisher, Witherspoon Mackay
Attorneys

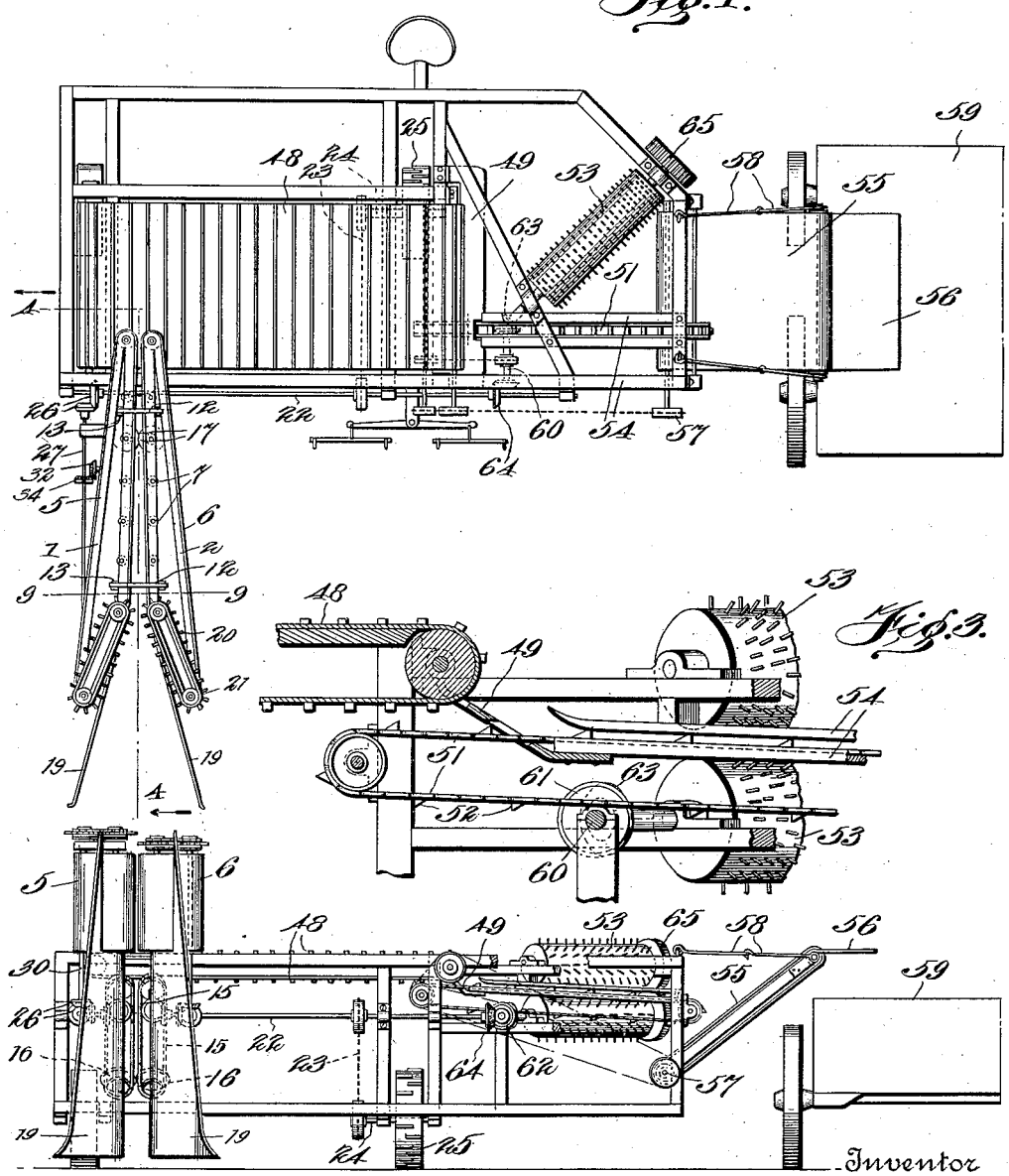

H. S. THOMAS.
BROOM CORN HARVESTER AND SEEDER.
APPLICATION FILED JUNE 27, 1912.

1,077,863.

Patented Nov. 4, 1913.

3 SHEETS—SHEET 3.

Witnesses

Inventor
Henry S. Thomas,
by Wilkinson, Fisher, Witherspoon & Mackaye
Attorneys

UNITED STATES PATENT OFFICE.

HENRY S. THOMAS, OF FARGO, OKLAHOMA.

BROOM-CORN HARVESTER AND SEEDER.

1,077,863.   Specification of Letters Patent.   Patented Nov. 4, 1913.

Application filed June 27, 1912. Serial No. 706,258.

*To all whom it may concern:*

Be it known that I, HENRY S. THOMAS, a citizen of the United States, residing at Fargo, in the county of Ellis and State of Oklahoma, have invented certain new and useful Improvements in Broom-Corn Harvesters and Seeders; and I do hereby declare the following to be a full, clear, and exact description of the invention, such as will enable others skilled in the art to which it appertains to make and use the same.

My invention relates to an improved broom corn harvester and seeder, and it consists in the constructions, combinations and arrangements herein described and claimed.

The object of my invention is to provide an improved broom corn harvester and seeder which will efficiently harvest the growing crop and automatically deliver the broom corn freed from its boot and seed to a wagon or other receptacle.

Figure 7:
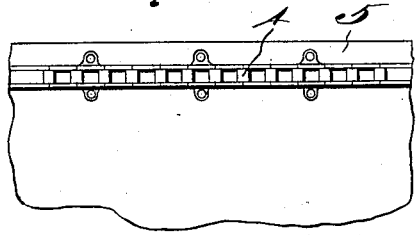
Figure 8:
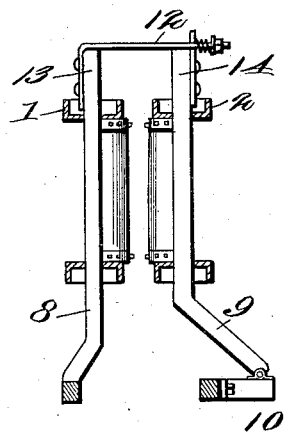
Figure 9:
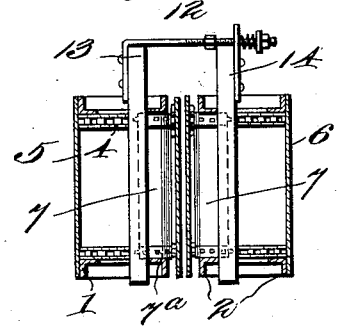
Figure 11:
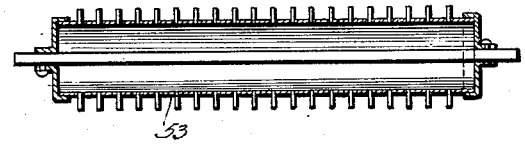
Figure 10:
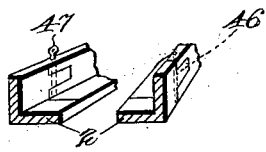

In the accompanying drawings forming a part of this application, and in which similar reference symbols indicate corresponding parts in the several views:—Figure 1 is a plan view, illustrating one embodiment of my invention; Fig. 2 is a front elevation of the construction shown in Fig. 1; Fig. 3 is an enlarged detail vertical section showing the forward end of the threshing cylinders and adjacent parts; Fig. 4 is an enlarged section on the line 4—4 of Fig. 1; Fig. 5 is a diagrammatic plan view, showing the driving connections for the endless vertical conveyer belts and breaker; Fig. 6 is a plan view of the stationary and shiftable frames for the vertical conveyer belts; Fig. 7 is a fragmentary view of the rear face of one of the vertical conveyer belts, showing one of the sprocket chains secured thereto; Fig. 8 is a section on the line 8—8 of Fig. 6; Fig. 9 is an enlarged section of the vertical conveyer belts and their frames on the line 9—9 of Fig. 1; Fig. 10 is a fragmentary perspective view, showing the hinged connections between the portions of the shiftable frame carrying one of the vertical conveyer belts, and Fig. 11 is an axial section of one of the threshing cylinders.

Referring to the drawings, 1 and 2 indicate frames, which are preferably formed of angle iron and carry a series of rollers 7 provided with upper and lower sprocket wheels 7ᵃ for engaging sprocket chains 4 secured on the rear faces of a pair of endless conveyer belts 5 and 6 having coöperating vertical faces for feeding the broom corn; the rearward rollers 7 being adjustably mounted in slots 3 in said frames to provide convenient means for tightening the conveyer belts 5 and 6. This provides a highly advantageous construction, in which the vertical endless belts are efficiently supported and driven for gripping therebetween the brush portion of the broom corn and feeding the latter past the stripping and cutting devices.

The frame 1 is preferably rigidly secured to the main frame, as by a standard 8, and the frame 2 is supported by a standard 9 pivoted to a bracket 10 on the main frame; the forward ends of said frames 1 and 2 being supported by adjustable rods 11. Spring clips 12 engage upward extensions 13 and 14 from the respective frames 1 and 2, for yieldingly resisting separation of said frames to maintain the vertical faces of the endless conveyer belts 5 and 6 in coöperating relation.

A pair of downwardly and rearwardly-inclined endless rubbing and breaking chains 15 are carried by sprocket wheels beneath the feeding portions of said conveyer belts 5 and 6, for removing the boot from the broom corn stalks; intermeshing gears 16 being secured to the spindles of the rear sprockets of said inclined chains 15. A pair of coöperating disk cutters 17 are carried by the spindles 18 of a pair of said rollers 7 for cutting the broom corn stalks.

A pair of converging collectors or guides 19 are carried by the forward ends of the frames 1 and 2 for directing the broom corn to the conveyer belts 5 and 6; said guides 19 flaring widely at their forward ends for insuring an efficient collector action on the leaning and irregular stalks. Endless chains 20 are mounted on sprocket wheels 21 secured to the spindles of the forward pair of rollers 7 in each of said frames 1 and 2 for forcing the broom corn from the collectors 19 between the conveyer belts 5 and 6.

A main drive shaft 22 is driven by a sprocket chain 23 from the axle 24 of a traction wheel 25, and is actuatingly connected by a pair of bevel gears 26 to a line shaft 27. The line shaft 27 carries a bevel gear 28 in mesh with a similar gear 29 secured to the spindle 30 of the forward roller 7 on the frame 1. A stub shaft 31 carries bevel gears 32 and 33 meshing, respectively, with bevel gears 34 and 35 on said shaft 27 and the spindle 36 of the forward sprocket wheel of the adjacent breaker chain 15; the coöperating breaker chain 15 being driven through the intermeshing gears 16 and having its forward spindle 37 actuatingly connected to a countershaft 38 by a stub shaft 39 carrying bevel gears 40 and 41 meshing, respectively, with bevel gears 42 and 43 on said spindle and countershaft. The countershaft 38 carries a bevel gear 44 in mesh with a similar gear 45 on the spindle of the forward roller 7 of the frame 2.

One side of the rear portion of the frame 2 is hinged, or pivoted, at 46, and the other side is detachably locked by a pin 47 to the main portion of said frame 2; thereby enabling said rear frame portion to be turned outward about its pivot 46 to clear the main frame of the machine when said frame 2 is swung downward about its pivotal support on the bracket 10. The frame 2 is shown pivoted on the bracket 10 substantially in line with the axis of the shaft 38; thereby permitting said frame 2 to be swung downwardly upon disengagement of the spring clips 12, to provide convenient access to the previously described drive mechanism, breaker chains and cutters.

An endless horizontal conveyer 48 extends beneath the rear ends of the conveyer belts 5 and 6 for transporting the broom corn delivered by said belts to an inclined table 49; a tripping device, such as a rod 50, extending beneath the rear portions of the conveyer belts 5 and 6 for engaging the lower portions of the severed broom corn fed by said belts, thereby causing said broom corn to be deposited transversely across the horizontal conveyer 48. An endless chain 51 provided with projections 52 carries the broom corn from the table 49 through a pair of threshing cylinders 53 for removing the seed from the brush portion thereof; the butt portions of the broom corn being confined between guides 54 during such feed through the threshing cylinders. An elevator 55 carries the broom corn from the threshing cylinders to a platform 56 mounted on the upper end of said elevator; the elevator 55 being swingingly supported on the main frame at 57 and provided with adjustable means, such as hook rods 58, for locking it in position for conveniently loading the broom corn from the platform 56 to a wagon, or other desired point. The lower threshing cylinder is driven by a stub shaft 60 having bevel gears 61 and 62 meshing, respectively, with bevel gears 63 and 64, secured to the spindle of said cylinder and to the main drive shaft 22; the upper threshing cylinder being driven by intermeshing gear wheels 65 on the spindes of said cylinders. The conveyer 48, endless chain 51, and elevator 55 may be driven by belts or sprocket chains in any suitable manner, such, for example, as indicated in Figs. 1 and 2 of the drawings.

From the above description, it will be clear that my invention provides an improved broom corn harvester and seeder, which will efficiently harvest the growing crop and deliver the broom corn in orderly arrangement after automatically freeing it from the boot and seed.

I have illustrated preferred and satisfactory constructions; but changes could be made within the spirit and scope of my invention.

I claim:—

1. In a broom corn harvester and seeder, the combination of a horizontal conveyer, a rigidly-mounted frame extending over said conveyer, a swinging frame provided with a pivotally-connected portion extending over said conveyer, means for locking said pivotally-connected portion rigidly on said swinging frame, endless feed belts on said respective frames provided with vertical coöperating faces for delivering broom corn to said horizontal conveyer, and resilient connections between said frames for causing said vertical belt faces to yieldingly grip the broom corn therebetween.

2. In a broom corn harvester and seeder, the combination of a horizontal conveyer, a rigidly-mounted frame extending over said conveyer, a swinging frame provided with a pivotally-connected portion extending over said conveyer, means for locking said pivotally-connected portion rigidly on said swinging frame, endless feed belts on said respective frames provided with vertical coöperating faces for delivering broom corn to said horizontal conveyer, means for driving said belts, converging collectors for guiding broom corn between said vertical belt faces, resilient connections between said frames for causing said vertical belt faces to yieldingly grip the broom corn therebetween, and cutters spaced beneath said coöperating vertical faces of the feed belts.

In testimony whereof, I affix my signature, in presence of two witnesses.

HENRY S. THOMAS.

Witnesses:
N. CURTIS LAMMOND,
W. MAX DUVALL.